United States Patent
Thevar et al.

(10) Patent No.: US 9,678,732 B2
(45) Date of Patent: Jun. 13, 2017

(54) FIRMWARE AGENT

(75) Inventors: Balakesan P. Thevar, Bangalore (IN); Sankaranarayanan Venkatasubramanian, Tamil Nadu (IN); Karunakara Kotary, Bangalore (IN); Rebecca Morali, Ma'aleh Adumim (IL); Karthick C, Bangalore (IN)

(73) Assignee: INTEL CORPORATION, Santa Clara, CA (US)

(*) Notice: Subject to any disclaimer, the term of this patent is extended or adjusted under 35 U.S.C. 154(b) by 690 days.

(21) Appl. No.: 13/618,508

(22) Filed: Sep. 14, 2012

(65) Prior Publication Data

US 2014/0082388 A1    Mar. 20, 2014

(51) Int. Cl.
*G06F 9/445* (2006.01)
*G06F 21/57* (2013.01)
*G06F 9/44* (2006.01)
*G06F 1/32* (2006.01)

(52) U.S. Cl.
CPC .......... *G06F 8/61* (2013.01); *G06F 9/4411* (2013.01); *G06F 21/575* (2013.01); *G06F 1/3206* (2013.01); *Y02B 60/183* (2013.01)

(58) Field of Classification Search
None
See application file for complete search history.

(56) References Cited

U.S. PATENT DOCUMENTS

| | | | |
|---|---|---|---|
| 5,692,204 A * | 11/1997 | Rawson et al. | 713/340 |
| 6,477,655 B1 * | 11/2002 | Delvaux et al. | 713/323 |
| 6,941,453 B2 | 9/2005 | Rao | |
| 7,433,300 B1 * | 10/2008 | Bennett | G06F 11/2005 370/216 |
| 7,669,195 B1 | 2/2010 | Qumei | |
| 7,676,665 B2 * | 3/2010 | Wyatt | G06F 9/4411 713/1 |
| 7,904,895 B1 | 3/2011 | Cassapakis et al. | |
| 8,245,219 B2 | 8/2012 | Agarwal et al. | |
| 2002/0023206 A1 * | 2/2002 | Klein | G06F 9/4401 713/1 |

(Continued)

FOREIGN PATENT DOCUMENTS

| RU | 2421811 C2 | 6/2011 |
|---|---|---|
| SU | 1116432 A1 | 9/1984 |

OTHER PUBLICATIONS

International Search Report for Application No. PCT/US2013/056915 dated Dec. 16, 2013.

(Continued)

*Primary Examiner* — Kim Huynh
*Assistant Examiner* — Paul J Yen
(74) *Attorney, Agent, or Firm* — Schwabe, Williamson & Wyatt, P.C.

(57) ABSTRACT

Methods, apparatuses and storage medium associated with providing firmware to a device are disclosed herein. In various embodiments, an apparatus may include a device, and a processor to host a computing environment that includes the device and a device driver of the device. Further, the apparatus may include a firmware agent, disposed outside the computing environment, to provide, on behalf of the device driver, firmware to the device on power-on of the device. Other embodiments may be described and claimed.

21 Claims, 5 Drawing Sheets

(56) References Cited

U.S. PATENT DOCUMENTS

| | | | | |
|---|---|---|---|---|
| 2004/0044914 | A1* | 3/2004 | Gedeon | 713/300 |
| 2004/0093597 | A1* | 5/2004 | Rao et al. | 717/171 |
| 2004/0254006 | A1* | 12/2004 | Lam et al. | 463/16 |
| 2005/0071617 | A1* | 3/2005 | Zimmer | G06F 9/4401 713/1 |
| 2005/0198487 | A1* | 9/2005 | Zimmer et al. | 713/2 |
| 2007/0271360 | A1* | 11/2007 | Sahita et al. | 709/223 |
| 2009/0254898 | A1* | 10/2009 | Sareen | G06F 8/61 717/174 |
| 2010/0199078 | A1* | 8/2010 | Shih | G06F 8/65 713/2 |
| 2012/0117555 | A1* | 5/2012 | Banerjee | G06F 8/65 717/168 |

OTHER PUBLICATIONS

International Preliminary Report on Patentability for PCT Application No. PCT/US2013/056915, dated Mar. 26, 2015, 7 pages.

* cited by examiner

FIRMWARE AGENT

TECHNICAL FIELD

This application relates to the technical field of data processing, more specifically to methods, apparatuses and storage medium associated with providing firmware to a device.

TECHNICAL FIELD

The background description provided herein is for the purpose of generally presenting the context of the disclosure. Unless otherwise indicated herein, the materials described in this section are not prior art to the claims in this application and are not admitted to be prior art by inclusion in this section.

Traditionally, firmware of a device is often provided to the device by a device driver of the device. However, before the firmware can be provided to the device, communication must be established between the device and the device driver. The protocol for establishing communication is often non-trivial. In a power consumption sensitive apparatus, e.g., a mobile computing device, a device may be frequently shut down. For example, a decoder in a computing tablet may be shut down hundreds of times in between decoding groups of video frames of a video, in the course of the video being played. Thus, the prior art approach to have the device driver provides the device firmware to the device is relatively inefficient.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION

Methods, apparatuses and storage medium associated with providing firmware to a device are disclosed herein. In various embodiments, an apparatus, e.g., a power consumption sensitive apparatus such as a computing tablet, may include a device, e.g., a decoder, and a processor to host a computing environment that includes the device and a device driver of the device. Further, the apparatus may include a firmware agent, disposed outside the computing environment, to provide, on behalf of the device driver, firmware to the device on power-on of the device. Accordingly, firmware may be provided to the device in a more efficient manner, especially where the device may be power off frequently, in the case of a power consumption sensitive computing apparatus. Other benefits and advantages may also be described and/or apparent to those skilled in art from the description to follow.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
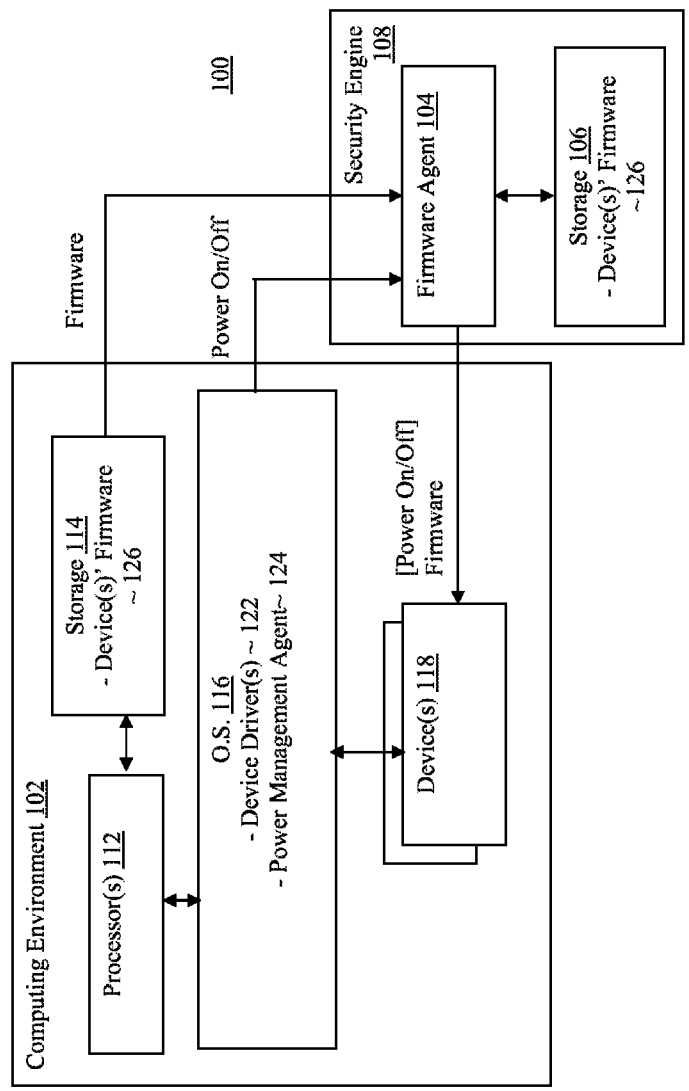
FIG. 1 illustrates an overview of an arrangement incorporated with a firmware agent to provide firmware to a device within a computing environment from outside the computing environment.

FIG. 1 illustrates an overview of an arrangement incorporated with a firmware agent to provide firmware to a device within a computing environment from outside the computing environment, in accordance with various embodiments. As illustrated, arrangement 100, such as a computing device, may include computing environment 102 hosted by one or more processors 112, and security engine 108, separately disposed outside computing environment 102 and coupled with computing environment 102 as shown. Computing environment 102, in addition to processors) 112, may further include storage 114, operating system (OS) 116, and one or more devices 118. Further, OS 116 may include one or more device drivers 122 of the one or more devices 118 and a power management agent 124. And storage 114 may include firmware 126 of the one or more devices 118. Security engine 108 may include firmware agent 104 and storage 106, having also firmware 126 of the one or more devices 118, obtained from storage 114. In embodiments, computing environment 102 and security engine 108 may be coupled with each other via one or more buses, e.g. an I²C bus or a peripheral component interconnect (PCI) bus, and so forth.

Processor(s) 112 may be any one of a number of processors or processor cores known in the art, e.g., Intel® Architecture processors available from Intel Corporation of Santa Clara, Calif. Storage 114 may be any one of a number magnetic, optical, or solid state storage known in the art. OS 116, likewise, may be any one of a number OS known in the art, e.g., one of the Window® family's OS available from Microsoft Corporation of Redmond, Wash. Examples of devices 118 may include, but are not limited to, an encoder, a decoder, a graphics unit, a transceiver, a global position system, and other devices of the like.

Security engine 108, as described earlier, may include firmware agent 104 and secure storage 106 coupled with each other. Firmware agent 104 may be coupled with storage 114, OS 116 and devices 118, as shown. Security engine 108 may be any one of a number of trusted computing environments or hardened embedded computing environment, separate and independent of computing environment 102. As will be described in more detail below, firmware agent 104 may be configured to provide devices 118 with their firmware 126, on detection of power-on events of devices 118. In some embodiments, firmware agent 104 may intercept the power-on/off signals from power management agent 124, and relay them to devices 118. In other embodiments (not shown), firmware agent 104 may be coupled to the signal path between power management agent 124 and devices 118 to detect the power-on/off events. As described earlier, provision of firmware to devices 118 by firmware agent 104 may be more efficient than the traditional approach (i.e., provision by device drivers 122), especially for frequently shut down devices 118 in a power consumption sensitive computing environment. Similar to storage 114, storage 106 may be any one of a number of magnetic, optical or solid state storage devices known in the art.

In embodiments, computing arrangement 100 may be a power consumption sensitive device, such as, but not limited to, a smartphone, a personal digital assistant (PDA), a computing tablet, an ultrabook, an e-reader, a game console, a set-top box, and so forth. In particular, power management agent 124 may be configured to power off one or more devices 118, e.g., whenever they are not in use, and power on the one or more devices 118, e.g., only when they are needed.

Before further describing firmware agent 104, it should be noted that while for ease of understanding, firmware agent 104 is being described as part of security engine 108, in alternate less security sensitive environment, firmware agent 104 may be disposed e.g., in a conventional unhardened embedded controller. Further, arrangement 100 is intended to represent a broad range of computing devices known in the art, Examples of arrangement 100 will be further described later with references to FIG. 4.

Figure 2:
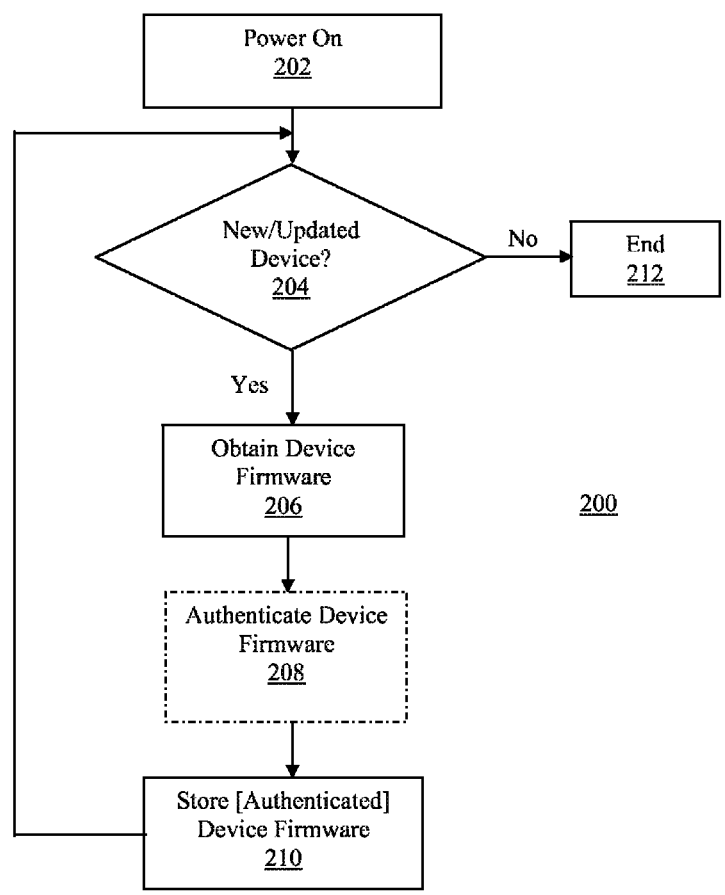
FIG. 2 illustrates a process for obtaining device firmware by the firmware agent.

FIG. 2 illustrates a process for obtaining device firmware by the firmware agent, in accordance with embodiments of the present disclosure. As illustrated, for the embodiments, process 200 may start at block 202. At block 202, computing arrangement 100 may be powered on. From block 202, process 200 may proceed to block 204. At block 204, firmware agent 104 may determine whether computing arrangement 100 has new devices 118 or devices 118 with updated device firmware. Firmware agent 104 may determine the presence of new devices 118 via a number of known techniques, e.g., by enumerating devices attached to the various buses (not shown) in computing environment 102. Firmware agent 104 may also determine whether certain device firmware has been updated by checking with OS 116 and/or device drivers 122, or checking data structures maintained by OS 116 and/or device drivers 122.

On determining either the presence of a new device or at least one updated device firmware, process 200 may proceed to block 206. At block 206, firmware agent 104 may obtain the new or updated firmware from device driver(s) 122 or storage 114. For the latter case, firmware agent 104 may be provided with the location(s) of the new or updated firmware by device driver(s) 122.

From block 206, process 200 may optionally proceed to block 208, or proceed to block 210 directly, without performing the operations of block 208. At block 208, for more security sensitive embodiments, firmware agent 104 may authenticate the firmware provided. Authentication may be performed using any one of a number of authentication techniques known in the art. At block 210, on successful authentication or without authentication, depending on implementation, firmware agent 104 may store the provided firmware in storage 106 (which in some embodiments, as described earlier, may be secured storage).

From block 210, process 200 may return to block 204 to determine if there are additional new or updated device firmware to be obtained, and repeat the operations of blocks 206-210 if necessary. On determination that there is no (additional) new or updated device firmware, process 200 may proceed to block 212, where the process may end.

In alternate embodiments, instead of having firmware agent 104 determining whether firmware of one or more devices have been updated, and proceed to obtain the updated version, with or without authentication, the update of firmware 126 stored in storage 106 may be triggered by the corresponding device driver 122, on receipt of updates to firmware 126 stored in storage 114.

Figure 3:
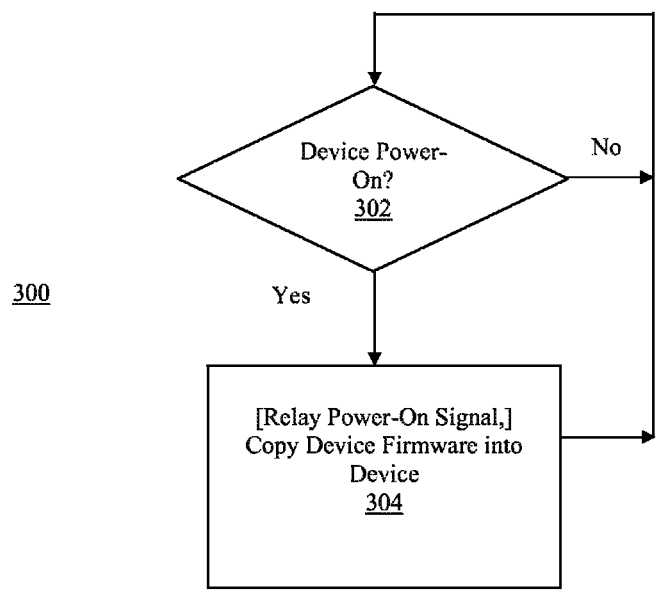
FIG. 3 illustrates a process for providing firmware to a device by the firmware agent.

FIG. 3 illustrates a process for providing firmware to a device by the firmware agent, in accordance with various embodiments of the present disclosure. Process 300 may start at block 302. At block 302, firmware agent 104 may monitor for a power on event of devices 118. When no device power on event is detected, process 300 may stay at block 302, and loop until such an event is detected.

On detection of a power on event of a device 118, process 300 may proceed from block 302 to block 304. At block 304, firmware agent 104 may retrieve firmware 126 of the device from storage 106, and provide the firmware 126 to device 118. By doing so, firmware 126 may be provided to device 118 more efficiently. In embodiments, at block 304, prior to retrieving and provide firmware 126 to device 118, firmware agent 104 may further relay power-on signals from power management agent 124 to devices 118. In embodiments, firmware agent 104 may also relay power-off signals from power management agent 124 to devices 118 (not shown).

Figure 4:
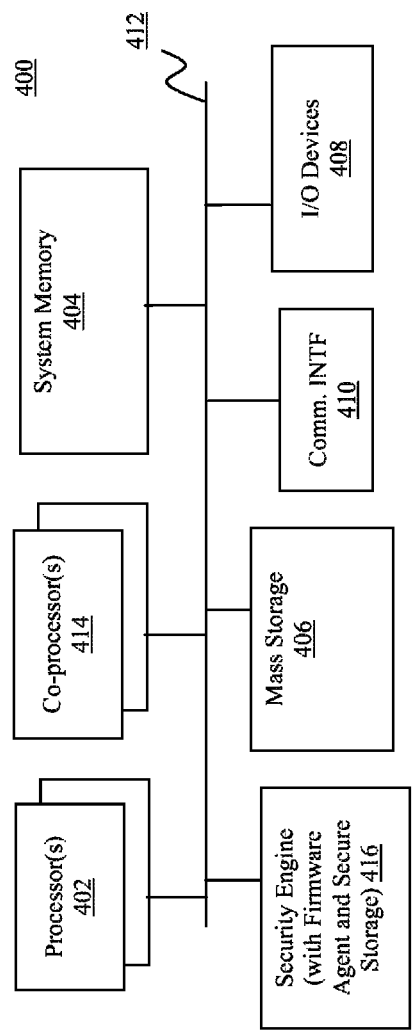
FIG. 4 illustrates an example computing device incorporated with a firmware agent.

FIG. 4 illustrates an example computing device incorporated with a firmware agent, in accordance with various embodiments of the present disclosure. As shown, computing device 400 may include a number of processors or processor cores 402, co-processor(s) 414, and system Memory 404. For the purpose of this application, including the claims, the terms "processor" and "processor cores" may be considered synonymous, unless the context clearly requires otherwise. Additionally, computing device 400 may include mass storage devices 406 (such as diskette, hard drive, compact disc read only memory (CD-ROM) and so forth), input/output devices 408 (such as display, keyboard, cursor control and so forth), communication interfaces 410 (such as network interface cards, modems and so forth) and security engine 416 (with firmware agent and storage as earlier described). The elements may be coupled to each other via system bus 412, which may represent one or more buses. In the case of multiple buses, they may be bridged by one or more bus bridges (not shown).

Except for element 416, the constitution of these elements 402-414 are known, and accordingly will not be further described. Security engine 416 may be a trusted execution environment or hardened embedded controller with its own processor or processors). Firmware agent in security engine 416 may be implemented in assembler instructions supported by processors) of security engine 416 or high-level languages, such as, for example, C, that can be compiled into such instructions.

The programming instructions may be placed into security engine 416 in the factory, or in the field, through, for example, a distribution medium (not shown), such as a compact disc (CD), or through communication interface 410 (from a distribution server (not shown)). That is, one or more distribution media having an implementation of the firmware agent may be employed to facilitate its distribution.

Figure 5:
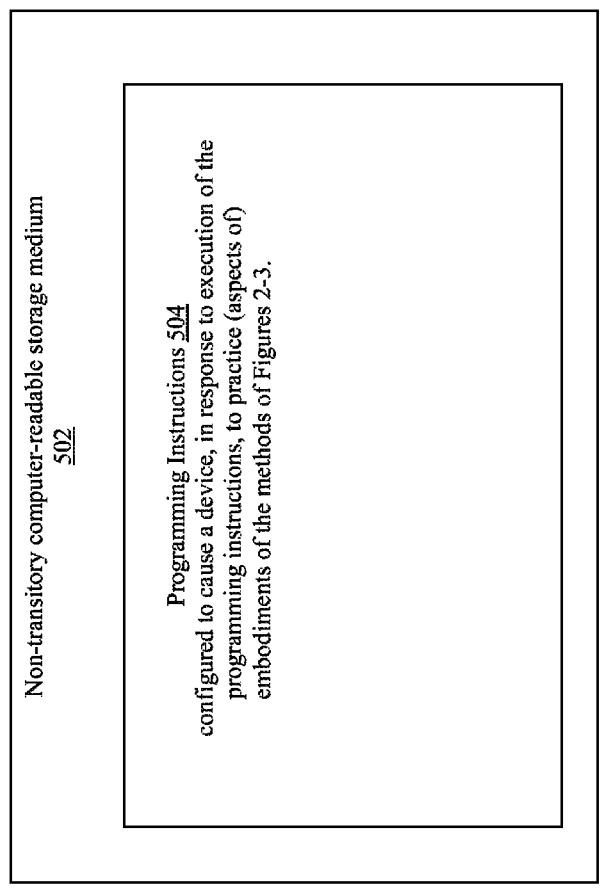
FIG. 5 illustrates an example non-transitory computer-readable storage medium having instructions configured to practice ail or selected aspects of the operational flows of the firmware agent illustrated with references to FIGS. 2-3; all arranged in accordance with embodiments of the present disclosure.

FIG. 5 illustrates an example non-transitory computer-readable storage medium having instructions configured to practice all or selected aspects of the processes of FIG. 2-3; in accordance with various embodiments of the present disclosure. As illustrated, non-transitory computer-readable storage medium 502 may include a number of programming instructions 504. Programming instructions 504 may be configured to enable a device, e.g., computing device 400, in response to execution of the programming instructions, to perform various operations of the various flows of FIGS. 2-3. In alternate embodiments, programming instructions 504 may be disposed on multiple non-transitory computer-readable storage media 502 instead.

Thus, embodiments disclosed include an apparatus having a device, and a processor, coupled with the device, to host a computing environment that includes the device and a device driver of the device. The apparatus may further includes a firmware agent, disposed outside the computing environment and coupled with the device, to provide, on behalf of the device driver, firmware to the device on power-on of the device.

In embodiments, the device may be a selected one of an encoder, a decoder, a graphics unit, a transceiver, or a global positioning system. The computing environment may further include a power management agent, coupled to the device, to power on or off the device. The firmware agent may be configured to provide the firmware to the device in response to the power management agent powering on the device. The power management agent may power off the device whenever the apparatus enters a power saving mode that consumes less power than a normal operating mode. The power management agent may further power off the device whenever the device has not been used for a period of time while the apparatus is in the normal operating mode.

In embodiments, the computing environment may further include an operating system that comprises the power management agent. The firmware agent may further configured to couple the power management agent to the device, and relay power on or off commands or signals of the power management agent to the device.

In embodiments, the firmware agent may be further configured to obtain the firmware from the device driver during a start-up of the apparatus. The apparatus may further include secure storage, disposed outside the computing environment and coupled with the firmware agent. And the firmware agent may be further configured to store the firmware in the secure storage, on obtaining the firmware during a start-up of the apparatus, and retrieve the firmware from the secure storage to provide to the device on power-on of the device. The firmware agent may be further configured to authenticate the firmware prior to storing the firmware into the secure storage. The apparatus may further include a security engine, disposed outside the computing environment, wherein the security engine includes the firmware agent. The apparatus may be a selected one of a smartphone or a computing tablet.

Embodiments disclosed also include at least one non-transitory computer-readable storage medium comprising a plurality of instructions, wherein the instructions, in response to execution of the instructions by a security engine of a computing apparatus, implement a firmware agent for the computing apparatus to provide firmware to a device of the computing apparatus, on behalf of a device driver of the device, on power-on of the device, wherein the device and the device driver are part of a computing environment hosted by a processor of the computing apparatus, and the security engine, including the firmware agent, is disposed outside of the computing environment and coupled to the device.

In embodiments, the computing environment may further include a power management agent, coupled to the device, to power on or off the device. The firmware agent may be further configured to provide the firmware to the device in response to the power management agent powering on the device. In embodiments, the firmware agent may be further configured to couple the power management agent to the device, and relay power on or off commands or signals of the power management agent to the device. In embodiments, the firmware agent may be further configured to obtain the firmware from the device driver during a start-up of the computing apparatus. The computing apparatus may further include secure storage, disposed outside the computing environment and coupled with the firmware agent. The firmware agent may be further configured to store the firmware in the secure storage, on obtaining the firmware during a start-up of the computing apparatus, and retrieve the firmware from the secure storage to provide to the device on power-on of the device. The firmware agent may be further configured to authenticate the firmware prior to storing the firmware into the secure storage.

Embodiments disclosed also include a method for providing firmware. The method may include detecting, by a firmware agent of a computing device, for power-on events of a device of the computing device; and providing firmware to the device, by the firmware agent, on behalf of a device driver of the device, in response to a detection of a power-on event of the device. The device and the device driver may be part of a computing environment hosted by a processor of the computing device, and die firmware agent may be disposed outside of the computing environment and coupled with the device.

In embodiments, the computing environment may further include a power management agent, coupled to the device, to power on or off the device. Providing may include providing the firmware to the device, the firmware agent, in response to the power management agent powering on the device. The method may further include coupling, the firmware agent, the power management agent to the device, and relaying, by the firmware agent, power on or off commands or signals of the power management agent to the device. The method may further include obtaining the firmware, by the firmware agent, from the device driver during a start-up of the computing device.

In embodiments, the computing device may further include secure storage, disposed outside the host computing environment and coupled with the firmware agent. The method may further include storing the firmware, by the firmware agent, in the secure storage, on obtaining the firmware during a start-up of the computing device, and retrieving the firmware, by the firmware agent, from the secure storage to provide to the device on power-on of the device. The method may further include authenticating the firmware, by the firmware agent, prior to storing the firmware into the secure storage.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims.

What is claimed is:

1. An apparatus, comprising:
  a first computing environment, that includes:
    a device;
    a processor, coupled with the device, to host the first computing environment;
    a power management agent, coupled to the device, to provide a power-on signal to the device, wherein the power-on signal is to cause the device to power on; and
    a first storage device, coupled with the processor, to store firmware associated with the device; and
  a second computing environment, disposed outside the first computing environment, that includes:
    a second storage device; and
    a firmware agent, communicatively coupled with the device, to:
      determine, by the firmware agent, that firmware stored on the first storage device was updated from a current version of the firmware stored on the second storage device based on data structures maintained by a device driver associated with the device;
      obtain, by the firmware agent, a copy of the firmware from the first storage device based on the determination that the firmware stored on the first storage device was updated;
      store, by the firmware agent, the copy of the firmware, obtained from the first storage device in the first computing environment, on the second storage device based on the determination that the firmware stored on the first storage device was updated;
      intercept, by the firmware agent, the power-on signal from the power management agent;
      relay, by the firmware agent, the power-on signal to the device; and
      provide, by the firmware agent, the copy of the firmware, from the second storage device, to the device in response to the relay of the power-on signal to the device.

2. The apparatus of claim 1, wherein the device comprises a selected one of an encoder, a decoder, a graphics unit, a transceiver, or a global positioning system.

3. The apparatus of claim 1, wherein the power management agent is further to provide a power-off signal to the device whenever the apparatus enters a power saving mode that consumes less power than a normal operating mode, wherein the power-off signal causes the device to power off.

4. The apparatus of claim 1, wherein the power management agent is further to provide a power-off signal to the device whenever the device has not been used for a period of time while the apparatus is in the normal operating mode, wherein the power-off signal causes the device to power off.

5. The apparatus of claim 1, wherein the first computing environment further includes an operating system that comprises the power management agent.

6. The apparatus of claim 1, wherein the firmware agent is to further:
  couple the power management agent to the device.

7. The apparatus of claim 1, wherein the second storage device is a secure storage device, and wherein the firmware agent is to further:
  obtain the copy of the firmware from the first storage device during a start-up of the apparatus;
  store the copy of the firmware in the secure storage device in response to obtainment of the copy of the firmware by the firmware agent; and
  retrieve the copy of the firmware from the secure storage device to provide to the device in response to detection of the power-on signal that occurs subsequent to the start-up of the apparatus.

8. The apparatus of claim 7, wherein the firmware agent is to further authenticate the copy of the firmware prior to storing the copy of the firmware into the secure storage device.

9. The apparatus of claim 1, wherein the second computing environment further includes a security engine, wherein the security engine includes the firmware agent.

10. The apparatus of claim 1, wherein the apparatus is a selected one of a smartphone or a computer tablet.

11. The apparatus of claim 1, wherein to determine that the firmware stored in the first storage device is updated includes to check with the device driver that the firmware has been updated.

12. At least one non-transitory computer-readable storage medium comprising a plurality of instructions, wherein the instructions, in response to execution of the instructions by a security engine of a computer apparatus, implement a firmware agent for the computer apparatus to:
  determine, by the firmware agent, that firmware, associated with a device of a computing environment, stored on a second storage device within the computing environment was updated from a current version of the firmware stored on a first storage device within the security engine based on data structures maintained by a device driver associated with the device, the security engine disposed outside the computing environment;
  obtain, by the firmware agent, a copy of the firmware from the second storage device based on the determination that the firmware stored on the second storage device was updated;
  store, by the firmware agent, the copy of firmware associated with the device on the first storage device based on the determination that the firmware stored on the second storage device was updated;
  intercept, by the firmware agent, a power-on signal transmitted from a power management agent of the computing environment to the device, wherein the power-on signal is to cause the device to power on;
  relay, by the firmware agent, the power-on signal to the device; and
  provide, by the firmware agent, the copy of the firmware to the device in response to the relay of the power-on signal to the device, wherein the copy of the firmware is retrieved from the first storage device for provision to the device.

13. The non-transitory computer-readable storage medium of claim 12, wherein the firmware agent is to further:
couple the power management agent to the device.

14. The non-transitory computer-readable storage medium of claim 12, wherein the firmware agent is to further obtain the copy of the firmware from the second storage device, for storage on the first storage device, during a start-up of the computer apparatus.

15. The non-transitory computer-readable storage medium of claim 14, wherein the first storage device comprises secure storage, coupled with the firmware agent, wherein the firmware agent is to further:
store the copy of the firmware in the secure storage, on obtainment of the copy of the firmware during the start-up of the computer apparatus that occurs prior to transmission of the power-on signal, and retrieve the firmware from the secure storage to provide to the device in response to detection of the power-on signal.

16. The non-transitory computer-readable storage medium of claim 15, wherein the firmware agent is to further authenticate the copy of the firmware prior to storage of the copy of the firmware in the secure storage.

17. A method comprising:
determining, by a firmware agent of a computer device, that firmware, associated with a device of the computer device, stored on a first storage device of a first computing environment was updated from a current version of the firmware stored on a second storage device of a second computing environment based on data structures maintained by a device driver associated with the device, the second computing environment disposed outside the first computing environment;
obtaining, by the firmware agent, a copy of the firmware from the first storage device based on the determination that the firmware stored on the first storage device was updated;
storing, by the firmware agent, the copy of the firmware on the second storage device based on the determination that the firmware stored on the first storage device was updated;
intercepting, by the firmware agent, a power-on signal transmitted from a power management agent of the computer device to the device, the power-on signal to cause the device to power on and the power management agent disposed within the first computing environment;
relaying, by the firmware agent, the power-on signal to the device; and
providing the copy of the firmware to the device, by the firmware agent, in response to the relay of the power-on signal, wherein the copy of the firmware is retrieved from the second storage device for provision to the device;
wherein the device is part of the first computing environment, the first computing environment hosted by a processor of the computer device, and the firmware agent is disposed in the second computing environment and is communicatively coupled with the device.

18. The method of claim 17, further comprising coupling, by the firmware agent, the power management agent to the device.

19. The method of claim 17, further comprising obtaining the copy of the firmware, by the firmware agent, from the first storage device for storage on the second storage device during a start-up of the computer device.

20. The method of claim 19, wherein the second storage device comprises secure storage, coupled with the firmware agent, wherein the method further comprises:
storing the copy of the firmware, by the firmware agent, in the secure storage, on obtainment of the copy of the firmware from the first storage device during a start-up of the computer device that occurs prior to the transmission of the power-on signal; and
retrieving the copy of the firmware, by the firmware agent, from the secure storage to provide to the device in response to detecting the transmission of the power-on signal.

21. The method of claim 20, further comprising authenticating the copy of the firmware, by the firmware agent, prior to storing the copy of the firmware into the secure storage.

* * * * *